US012664308B2

(12) United States Patent
Doerr et al.

(10) Patent No.: US 12,664,308 B2
(45) Date of Patent: Jun. 23, 2026

(54) PERSONAL DATA ANONYMIZATION SYSTEM (PDAS) WITH CUSTOMIZED TOKEN

(71) Applicant: BIOTRONIK SE & Co. KG, Berlin (DE)

(72) Inventors: Thomas Doerr, Berlin (DE); Dominic Wist, Berlin (DE)

(73) Assignee: BIOTRONIK SE & Co. KG, Berlin (DE)

( * ) Notice: Subject to any disclaimer, the term of this patent is extended or adjusted under 35 U.S.C. 154(b) by 112 days.

(21) Appl. No.: 18/263,736

(22) PCT Filed: Feb. 3, 2022

(86) PCT No.: PCT/EP2022/052524
§ 371 (c)(1),
(2) Date: Aug. 1, 2023

(87) PCT Pub. No.: WO2022/171509
PCT Pub. Date: Aug. 18, 2022

(65) Prior Publication Data
US 2024/0119174 A1      Apr. 11, 2024

(30) Foreign Application Priority Data
Feb. 10, 2021      (DE) .......................... 202021100647.1

(51) Int. Cl.
*G06F 21/62* (2013.01)
*H04L 9/32* (2006.01)
(52) U.S. Cl.
CPC ........ *G06F 21/6254* (2013.01); *H04L 9/3213* (2013.01); *H04L 9/3268* (2013.01)

(58) Field of Classification Search
CPC .. G06F 21/6254; H04L 9/3213; H04L 9/3268
(Continued)

(56) References Cited

U.S. PATENT DOCUMENTS 8,793,805 B1 *   7/2014   Johansson ........... G06F 21/6254
                                                                726/26
9,727,751 B2 *   8/2017   Oliver ................... H04L 63/102
(Continued)

OTHER PUBLICATIONS

International Search Report (PCT/ISA/210) and Written Opinion (PCT/ISA/237) mailed on May 11, 2022, by the European Patent Office as the International Searching Authority for International Application No. PCT/EP2022/052524. (12 pages).

*Primary Examiner* — Thanh T Le
(74) *Attorney, Agent, or Firm* — Buchanan Ingersoll & Rooney PC

(57) ABSTRACT

The invention relates to a device and method for protecting sensitive personal data held in a public storage, comprising a trusted tokenization system having at least one trusted interface to an instance that may provide, process, possess, and/or retrieve sensitive personal data, and at least one interface to a public storage not containing sensitive personal data, wherein the tokenization system is configured to replace a sensitive personal reference of the data in the public storage with a non-sensitive data element and to store an association between the sensitive personal reference and the non-sensitive data element in a secure environment, wherein the non-sensitive data element is generated in a user-specific manner such that the non-sensitive data element can be processed in an existing infrastructure of a user without adaptation of said infrastructure.

14 Claims, 1 Drawing Sheet

(58) Field of Classification Search
USPC ......................................................... 713/193
See application file for complete search history.

(56) References Cited

U.S. PATENT DOCUMENTS

| | | | |
|---|---|---|---|
| 10,333,901 B1* | 6/2019 | Bauman ................... | H04L 63/20 |
| 11,615,210 B1* | 3/2023 | Buckingham ......... | G06F 21/606 |
| | | | 713/165 |
| 11,645,417 B2* | 5/2023 | Lee .......................... | G06F 21/64 |
| | | | 726/2 |
| 11,646,888 B2* | 5/2023 | Apsingekar ........... | H04L 9/0891 |
| | | | 713/159 |
| 11,657,181 B2* | 5/2023 | Apsingekar ........... | H04L 9/3213 |
| | | | 726/26 |
| 11,658,946 B2* | 5/2023 | McFarland ........... | G16H 10/60 |
| | | | 726/27 |
| 11,755,779 B1* | 9/2023 | Gupta ................... | G16H 20/10 |
| | | | 726/26 |
| 11,757,880 B2* | 9/2023 | Mital ................. | G06F 11/3438 |
| | | | 713/168 |
| 2012/0324225 A1* | 12/2012 | Chambers ............. | H04L 9/0891 |
| | | | 713/169 |
| 2012/0330786 A1* | 12/2012 | Paleja ................... | G06F 21/125 |
| | | | 709/217 |
| 2014/0026194 A1* | 1/2014 | Smith ................. | G06F 21/6245 |
| | | | 726/4 |
| 2014/0282464 A1* | 9/2014 | El-Gillani ............... | G06F 16/00 |
| | | | 713/189 |
| 2014/0298030 A1* | 10/2014 | Akiyama .............. | H04L 63/062 |
| | | | 713/172 |
| 2015/0244681 A1* | 8/2015 | Blumenfeld .............. | H04L 9/30 |
| | | | 713/168 |
| 2016/0142380 A1* | 5/2016 | Fuller ................. | G06F 21/6254 |
| | | | 726/9 |
| 2017/0177798 A1* | 6/2017 | Samuel ................... | G16H 10/65 |
| 2018/0062832 A1 | 3/2018 | Hatcher | |
| 2018/0211059 A1* | 7/2018 | Aunger ................. | H04L 63/166 |
| 2018/0285597 A1* | 10/2018 | Mahonin .............. | H04L 9/3239 |
| 2018/0307859 A1* | 10/2018 | LaFever ................. | H04L 63/20 |
| 2019/0253431 A1* | 8/2019 | Atanda ................... | G06F 21/62 |
| 2019/0286832 A1* | 9/2019 | Szeto ................. | H04W 12/082 |
| 2019/0342088 A1* | 11/2019 | Eidson ...................... | H04L 9/14 |
| 2021/0081565 A1* | 3/2021 | Sakamoto ........... | G06F 21/6245 |
| 2021/0256159 A1* | 8/2021 | Ninglekhu .............. | H04W 4/70 |
| 2021/0390196 A1* | 12/2021 | Lavine ................. | H04L 63/102 |
| 2022/0050921 A1* | 2/2022 | LaFever .............. | G16H 10/60 |
| 2022/0191190 A1* | 6/2022 | Glozman ............. | H04L 9/3215 |
| 2023/0319533 A1* | 10/2023 | Ly ........................... | H04L 43/04 |
| | | | 709/224 |

* cited by examiner

P 100     110

120

130

140

150

160

S1

S2

S3

S4

PERSONAL DATA ANONYMIZATION SYSTEM (PDAS) WITH CUSTOMIZED TOKEN

CROSS-REFERENCE TO RELATED APPLICATIONS

This application is the United States National Phase under 35 U.S.C. § 371 of PCT International Patent Application No. PCT/EP2022/052524, filed on Feb. 3, 2022, which claims the benefit of German Patent Application No. 20 2021 100 647.1, filed on Feb. 10, 2021, the disclosures of which are hereby incorporated by reference herein in their entireties.

TECHNICAL FIELD

The present invention describes a device and method for managing sensitive personal data in public storage systems without allowing unauthorized personal data association.

BACKGROUND

There are an increasing number of external cloud providers and service providers who are interested in large amounts of personal data (e.g., health data), can manage it, can migrate heterogeneous data, as well as want to process this data, e.g., using machine learning, to provide improved diagnostic support for physicians, for example. Such cloud service providers include general public clouds (for example, from Google or Apple) or specific health provider clouds (for example, from Cerner, Epic or from health insurance companies). With these cloud providers, there is a fundamental risk of disclosure of the collected patient data or its falsification, as well as legal limitations to process personal data.

The aforementioned problems are solved in the state of the art, e.g., by
  the encryption of stored data, or
  the use of closed systems for storing sensitive personal data.

However, such known solutions—due to the need for trustworthy handling of sensitive personal data—cannot take advantage of big non-trusted data services, such as cloud storage and public big data systems.

The present invention is therefore based on an object to provide a device or personal data anonymization system (PDAS) that is improved with respect to the aforementioned problem. In particular, a PDAS is to be provided for the secure delivery of unaltered and sufficiently anonymized personal data, preferably health data (cf. also HIPAA compliance) for the corresponding external cloud service providers. In particular, only data authorized by the to individual or patient should be able to be sent to external service providers. For example, to a "low risk" health cloud different or less anonymized personal data should be able to be sent than to a public "high risk" health cloud e.g., from Google.

In particular, only the device according to the present invention (PDAS) should be able to perform the assignment of the person to all its data elements and also to release only subsets of this data, after the person has released them, to appropriate external entities. Furthermore, the integrity of each stored data element shall be secured.

The present disclosure is directed toward overcoming one or more of the above-mentioned problems, though not necessarily limited to embodiments that do.

SUMMARY

At least the object set forth above is solved by a device having the features of claim 1. Advantageous embodiments of this aspect of the present invention as well as further aspects of the present invention are described below.

According to claim 1 a device for protecting sensitive personal data held in a public storage is provided, comprising a trusted tokenization system having at least one trusted interface to an instance that may provide, process, possess, and/or retrieve sensitive personal data.

The device further provides at least one interface to a public storage not containing sensitive personal data, wherein the tokenization system is configured to replace a sensitive personal reference of the data in the public storage with a non-sensitive data element and to store an association between the sensitive personal reference and the non-sensitive data element in a secure environment, wherein the non-sensitive data element is generated in a user-specific manner such that the non-sensitive data element can be processed in an existing infrastructure of a user without adaptation of said infrastructure.

The device according to the present invention is also referred to herein as a personal data anonymization system.

In other words, the present invention relates to a device that allows sensitive personal data to be managed in public storage systems without allowing unauthorized personal data association by replacing the sensitive personal reference of the data in the public storage systems with a non-sensitive customized data element (token) and establishing the association between sensitive personal reference and non-sensitive data element in a secured and authorized environment.

The present invention therefore advantageously allows sensitive personal data to be stored openly (i.e., unencrypted) in a non-trusted storage without a reference to the individual person being possible, but this reference can be re-established in a trusted environment, so that the persons providing the individual data can benefit from the results of the data analysis by the above-mentioned systems.

According to an aspect of the present invention, the personal data is health data and/or patient data.

According to a further aspect of the present invention, the device further comprises a preferably configurable, rights system for data access.

According to a further aspect of the present invention, the tokenization system is configured to manage distributed data elements of the user and/or assign distributed data elements to the user.

According to a further aspect of the present invention, the tokenization system is configured to generate non-sensitive data elements, in particular tokens, for different use cases.

According to a further aspect of the present invention, the device is configured to encrypt and/or sign the sensitive personal data.

According to a further aspect of the present invention, the device is configured to prevent falsification of data.

According to a further aspect of the present invention, the device is configured to prevent incorrect assignment of data.

According to a further aspect of the present invention, the device is configured to include the user, in particular a patient, as a central data release instance.

According to a further aspect of the present invention, the device is configured to allow the user, anonymized by a non-sensitive data element, to authorize a release of data, in particular patient medical data, to a cloud service provider.

According to a further aspect of the present invention, the device is configured to perform a two-factor authentication to confirm the data release, said two-factor authentication comprising at least one of a fingerprint, a face ID, an implanted ID readable via smartphone nearfield communication and an authorization server interface.

According to a further aspect of the present invention, the device is configured to allow the user to authorize predetermined uses of the data, in particular feeding the data to a machine learning system and/or not storing it in clinical trial databases.

According to a further aspect of the present invention, the device further comprises or is connected to a database in the secure environment, wherein if data is queried from the database, requested data elements are provided with a cryptographic checksum for which a certificate is issued externally together with the query result.

According to a further aspect of the present invention, the device is configured to, with each assignment, send sensitive personal data to a cloud server, the non-sensitive data element, an associated data element ID and a security code, wherein the security code is valid for a predetermined period of time and is encrypted with a token key.

The technical solution of the present invention is based on the concept of so-called tokenization: This means that sensitive person-identifying information, i.e., the person ID (e.g., surname+first name+date of birth+place of residence), is replaced by reference values, so-called tokens. A token can be used without restriction by external systems and applications, while the personal reference to this token is stored in a secure data vault. Thus, the external cloud service providers do not need to store sensitive personal-identifying data to evaluate personal health data. Tokenization, when applied to data security, can thus be understood as a process of replacing a sensitive data element with a non-sensitive equivalent called a token that has no extrinsic or exploitable meaning or value. The token is a reference (i.e., an identifier) that is mapped back to the sensitive data through a tokenization system. In mapping original data to a token, methods are used to make it impossible to reverse the token in the absence of the tokenization system.

The device or personal data anonymization system according to the present invention allows a person (anonymized by a token) at a time to authorize the release of certain data from the PDAS, e.g., to a cloud service provider. The PDAS should have access to all external storage on which the "tokenized" personal data is stored. It should also be able to securely cache the data elements to be issued and securely perform the assignment of the token to a person ID. This allows the PDAS to issue the requested patient data, matching the requested token, to the cloud service provider. In the process, the person communicates with the cloud service provider only anonymously, i.e., in the form of a unique token. Only the PDAS can resolve the token to the person. Nevertheless, the cloud service providers receive personal data (i.e., data of an anonymous person), which they can use for machine learning applications, for example.

For example, the person can authorize via a smartphone app only the release of certain anonymized data elements for a specific external cloud service provider. (The values of the data elements reside in a further external storage (e.g., private clinic cloud) but not on the person's smartphone.) Here, there may be a second factor to confirm the release of this data, e.g., a fingerprint, face ID, implanted ID that can be read via smartphone NFC or an authorization server interface (such as Google Authenticator).

Further, the individual can authorize certain uses of this data (e.g., feeding it into a machine learning system, but not storing it in databases for clinical trials) and exclude others.

Further, the individual has the right to delete his or her token-to-person reference from the PDAS at any time.

In addition to the PDAS, there may be a database that contains all personal data and stores it securely (e.g., encrypted and/or signed). This means that the data is thus stored confidentially, with integrity, and available. If data is queried from this database (e.g., due to a cloud service provider request to the PDAS), then this query result, i.e., the requested data elements, can be automatically provided with a cryptographic checksum (signature), for which a certificate (for signature verification) is given together with the query result and the data can thus be checked for integrity (unalteredness) at any time.

In principle, if not explicitly released by the person, only anonymized data is preferably given to external systems by the PDAS. These are preferably at least HIPAA-compliant and/or DSGVO-compliant anonymizations (e.g., names, sexuality, religion, or party affiliations should never be given to a token to the outside world). In addition to the HIPAA and DSGVO rules for anonymization of externally requested data sets, further rules can be implemented, e.g., a rare disease combined with a rare blood type of a person may also not be given externally without restrictions or only after a second consent by the person. It is conceivable to implement further anonymization rules.

Since the person has requested the release of certain data only at a certain point in time and has authorized it, e.g., via smartphone and a second factor, it should preferably not be possible to make said data available to the cloud service providers chosen at that time even, e.g., years later by means of a replay attack. For this purpose, each transaction is preferably additionally authorized by a unique dynamic security code.

Furthermore, it can be provided that when a person requests a token from the PDAS, the person not only gets back the token, but additionally also a token key (technically: a public key). With each transaction, i.e., the request to send certain data elements (identified by data element IDs) to a cloud service provider, which the person initiates, not only the token and the associated authorized data element IDs are then sent, but also a security code that is unique for the transaction and only valid for a certain period of time (e.g., 10 minutes), encrypted with the token key. The security code is a hash value encrypted with the token key consisting of: Token+data element IDs to be sent+time stamp to the minute+IP address of the person+possibly other transaction-specific details.

The cloud service provider receives the transaction data from the smartphone of the person. Then the cloud service provider forwards this data and the IP address of the person's smartphone to the PDAS. There, the transaction is checked by means of the encrypted hash value, which can only be decrypted in the PDAS (with the private key belonging to the public key), to see whether it is unchanged, was sent from the original IP address and is still valid in the current time window.

Then the token is mapped to the real person (or person ID) within the PDAS and the required data is collected from the other (external) stores and only this data belonging to the token and sufficiently anonymized according to all required rules is sent to the cloud service provider as a response. Thus, a replay of the transaction data 10 minutes later or from another IP address is no longer possible.

Another aspect of the present invention relates to a method for protecting sensitive personal data managed in public storage systems, wherein a trusted tokenization system has at least one trusted interface to an instance that may provide, process, possess and/or retrieve sensitive personal data, and at least one interface to a public (i.e., non-trusted)

storage which may not contain sensitive personal data. The tokenization system replaces the sensitive personal reference of the data in the public storage systems with a non-sensitive data element (token) and stores the association between sensitive personal reference and token in a secure environment, wherein the token is generated user-specifically or customer-specific (individually), so that in particular the token can be processed in an existing infrastructure of the user or customer without adaptation of this infrastructure.

The embodiments of the present invention mentioned above with respect to the device according to the present invention can be used in an analogous manner for further development of the method according to the present invention.

Additional features, aspects, objects, advantages, and possible applications of the present disclosure will become apparent from a study of the exemplary embodiments and examples described below, in combination with the Figures and the appended claims.

BRIEF DESCRIPTION OF THE DRAWINGS

In the following, an exemplary embodiment of the present invention as well as further features and advantages of the present invention will be explained with reference to the figure.

It shows.

DETAILED DESCRIPTION

Figure 1:
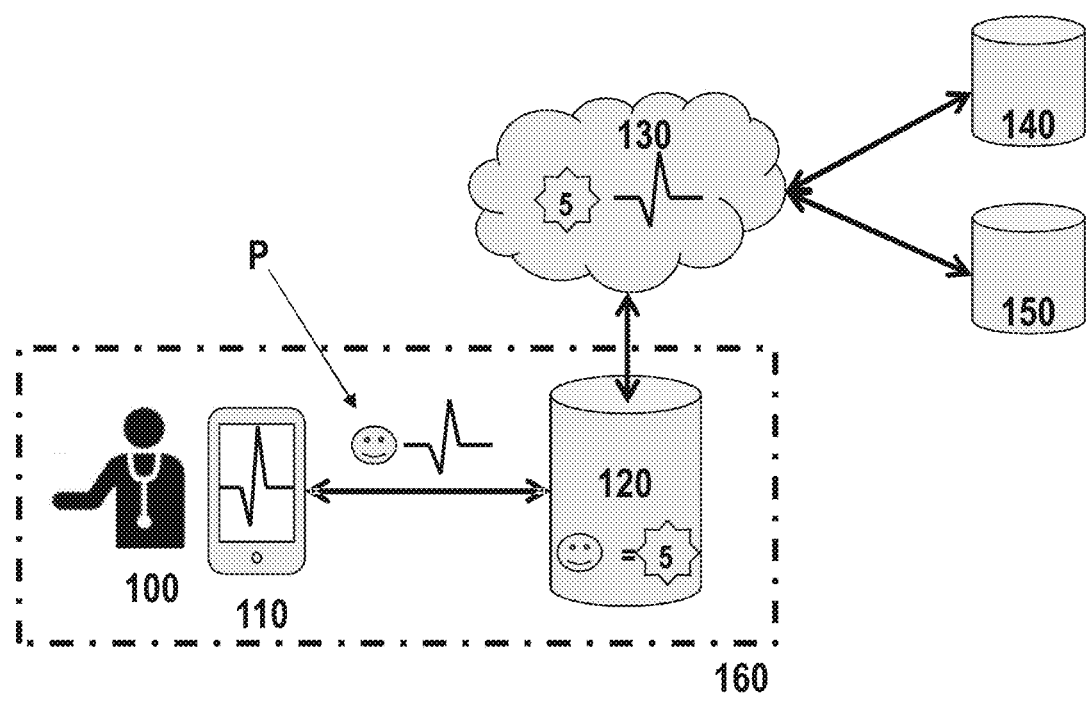
FIG. 1 a depiction of a device for protecting sensitive personal data held in a public storage according to a preferred embodiment of the present invention.

FIG. 1 shows a simplified implementation example of a device 120 according to the present invention and a PDAS 110, using the example of a doctor-patient relationship. In this example, the physician 100 sends an ECG of a patient P via a secured trusted access device 110, for example, in the form of a smartphone, a PDAS client, etc., with the associated patient information to the secured trusted access device 110. The device 120 includes a transmitter and a receiver to facilitate communication with and transmission of data to/from the secured trusted access device 110 and the storage 130.

This PDAS generates a non-sensitive data element 5 or a token in the form of a one-to-one, but non-sensitive, non-spyable information unit and thus replaces the sensitive person or patient reference. The assignment of token and patient P is stored exclusively in the PDAS.

Subsequently, the ECG with associated token is uploaded to a generally accessible storage 130, for example, a data cloud. Optionally, further data analysis systems, such as an ECG data analysis system 140 based on AI (Artificial Intelligence, Machine learning, etc.), can be connected to this data cloud, which is instructed to find the ECG data, or still further systems can be connected, such as at least one system with applications for statistical ECG data evaluation 150.

Any reference to persons takes place exclusively in the trusted or secure environment 160 and in the non-trusted environment, such as the storage 130, further analyses and data evaluations (in general: big-data applications) can be carried out, which require a large database, but do not have to have any reference to persons.

The physician 100 can query the results of the analyses and evaluations via secure access with a PDAS client 110 connected to the PDAS and establish the personal reference. The PDAS may be configured as a server.

In this case, the trusted or secure environment 160 may be provided, for example, for a fee as a universal interface.

The present invention advantageously allows sensitive personal data to be stored and processed in "public", non-trusted storage systems without limiting the protection of the personal data. The token used for pseudonymization is generated in a customer-specific structure so that it can be processed in existing IT infrastructures without additional adaptation.

Figure 2:
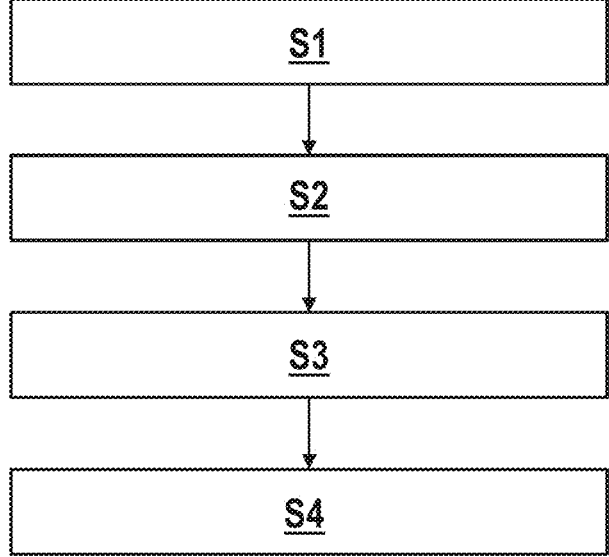
FIG. 2 a flowchart of a computer implemented method for protecting sensitive personal data held in a public storage according to the preferred embodiment of the present invention.

FIG. 2 shows a flowchart of a computer implemented method for protecting sensitive personal data held in a public storage according to the preferred embodiment of the present invention.

The method comprises providing S1, processing, possessing, and/or retrieving sensitive personal data by means of a trusted tokenization system having at least one trusted interface to an instance and providing S2 at least one interface to a public storage 130 not containing sensitive personal data.

The method further comprises replacing S3 a sensitive personal reference of the data in the public storage with a non-sensitive data element 5 by means of the tokenization system.

In addition, the method comprises storing S4 an association between the sensitive personal reference and the non-sensitive data element 5 in a secure environment 160, wherein the non-sensitive data element 5 is generated in a user-specific manner such that the non-sensitive data element 5 can be processed in an existing infrastructure of a user without adaptation of said infrastructure.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

REFERENCE SIGNS

5 non-sensitive data elements
100 physician
110 trusted access (PDAS client)
120 device
130 public storage
140 ECG data analysis system
150 statistical ECG data evaluation
160 secure environment
P patient
S1-S4 method steps

The invention claimed is:

1. A device for protecting sensitive personal data held in a public storage, comprising:
    a transmitter and a receiver;

at least one trusted interface to a secured trusted access computing device that provides, processes, possesses, and/or retrieves sensitive personal data; and at least one interface to a public storage not containing sensitive personal data, wherein the device is configured to replace a sensitive personal reference of the sensitive personal data in the public storage with a non-sensitive data element and to store an association between the sensitive personal reference and the non-sensitive data element in a secure environment, wherein the non-sensitive data element is generated in a user-specific manner such that the non-sensitive data element is processed in an existing infrastructure of a user without adaptation of said infrastructure, wherein the device further comprises or is connected to a database in the secure environment, wherein when data is queried from the database, requested non-sensitive data elements are provided with a cryptographic checksum for which a certificate is issued externally together with the query result, wherein the device is configured to send, for a specific transaction, the sensitive personal data, the non-sensitive data element, an associated data element ID, and a security code, wherein the security code is valid for a predetermined period of time and is encrypted with a token key that is unique for the transaction and only valid for the predetermined period, wherein the token key includes: a Token data element IDs of data to be sent, time stamp to the minute, IP address of a person that the sensitive personal data belongs to, and transaction-specific details.

2. The device of claim 1, wherein the sensitive personal data is health data and/or patient data.

3. The device of claim 1, further comprising a configurable, rights system for data access.

4. The device of claim 1, wherein the device is configured to manage distributed data elements of the user and/or assign distributed data elements to the user.

5. The device of claim 1, wherein the device is configured to generate plural non-sensitive data elements as tokens for different use cases.

6. The device of claim 1, wherein the device is configured to encrypt and/or sign the sensitive personal data.

7. The device of claim 1, wherein the device is configured to prevent falsification of the sensitive personal data.

8. The device of claim 1, wherein the device is configured to prevent incorrect assignment of the sensitive personal data.

9. The device of claim 1, wherein the device is configured to include the user as a central data release instance.

10. The device of claim 1, wherein the device is configured to allow the user, anonymized by the non-sensitive data element, to authorize a release of the sensitive personal data to a cloud service provider.

11. The device of claim 10, wherein the device is configured to perform a two-factor authentication to confirm the sensitive personal data release, said two-factor authentication comprising at least one of a fingerprint, a face ID, an implanted ID readable via smartphone nearfield communication and an authorization server interface.

12. The device of claim 1, wherein the device is configured to allow the user to authorize predetermined uses of the sensitive personal data by feeding the sensitive personal data to a machine learning system and/or not storing it in clinical trial databases.

13. The device of claim 1, wherein the device further comprises or is connected to a database in the secure environment, wherein when data is queried from the database, requested non-sensitive data elements are provided with a cryptographic checksum for which a certificate is issued externally together with the query result.

14. A computer implemented method for protecting sensitive personal data held in a public storage, comprising the steps of:

Providing, processing, possessing, and/or retrieving sensitive personal data by means of a device having a transmitter, a receiver, and at least one trusted interface to a secured trusted access device;

Providing at least one interface to a public storage not containing sensitive personal data;

Replacing a sensitive personal reference of the sensitive personal data in the public storage with a non-sensitive data element by means of the device;

Storing an association between the sensitive personal reference and the non-sensitive data element in a secure environment, wherein the non-sensitive data element is generated in a user-specific manner such that the non-sensitive data element is processed in an existing infrastructure of a user without adaptation of said infrastructure;

Querying data and providing requested non-sensitive data elements with a cryptographic checksum for which a certificate is issued externally together with the query result;

Sending, for a specific transaction, the sensitive personal data, the non-sensitive data element, an associated data element ID, and a security code, wherein the security code is valid for a predetermined period of time and is encrypted with a token key that is unique for the transaction and only valid for the predetermined period, wherein the token key includes: a Token, data element IDs of data to be sent, time stamp to the minute, IP address of a person that the sensitive personal data belongs to, and transaction-specific details.

* * * * *